United States Patent
Egretier

Patent Number: 5,377,584
Date of Patent: Jan. 3, 1995

[54] DEJUICING PRESS FOR DIFFERENT PRODUCTS

[76] Inventor: Jean-Michel Egretier, Domaine des Camplazens (B.P. 301), Narbonne Cedex, France, 11103

[21] Appl. No.: 4,126

[22] Filed: Jan. 13, 1993

[30] Foreign Application Priority Data

Jan. 13, 1992 [FR] France .................. 92 00421
Nov. 6, 1992 [FR] France .................. 92 13793

[51] Int. Cl.6 ................................. B30B 9/06
[52] U.S. Cl. ................... 100/110; 100/116; 100/126; 100/185; 100/189; 100/190; 100/207; 100/232
[58] Field of Search ........... 100/110, 116, 126, 127, 100/179, 185, 188 R, 189, 190, 207, 208, 232, 237

[56] References Cited

U.S. PATENT DOCUMENTS

| | | | |
|---|---|---|---|
| 3,089,410 | 5/1963 | Stangl | 100/232 X |
| 3,303,946 | 2/1967 | Wilkins | 100/179 X |
| 3,451,185 | 6/1969 | Tezuka | 100/232 X |
| 3,621,775 | 11/1971 | Dedio et al. | 100/179 X |
| 3,908,538 | 9/1975 | Boyd | 100/232 X |
| 4,158,332 | 6/1979 | Melandri | 100/127 |
| 4,303,412 | 12/1981 | Baikoff | 100/127 X |

FOREIGN PATENT DOCUMENTS

| | | | |
|---|---|---|---|
| 761436 | 3/1934 | France | 100/116 |
| 2577167 | 4/1986 | France | 100/126 |
| 406885 | 12/1924 | Germany | 100/192 |
| 358202 | 4/1938 | Italy | 100/185 |
| 1481415 | 7/1977 | United Kingdom | 100/116 |

*Primary Examiner*—Stephen F. Gerrity
*Attorney, Agent, or Firm*—Jacobson, Price, Holman & Stern

[57] ABSTRACT

A dejuicing press has a cylindrical main pressing chamber defined by a cylindrical dripping grate. A composite piston arrangement is used in the chamber which includes an internal piston surrounded by an external annular piston. Separate drives are provided for the two pistons so that they can be moved together or separately in the same direction or in opposite directions to effect the various stages of a pressing cycle. The press may also have a pre-pressing chamber which feeds the main pressing chamber and in which a pre-pressing piston operates, and a transfer chamber at one end of the pre-pressing chamber in which there is a third piston.

7 Claims, 6 Drawing Sheets

DEJUICING PRESS FOR DIFFERENT PRODUCTS

BACKGROUND OF THE INVENTION

This invention relates to a press for different products, particularly a horizontal winepress, suitable for squeezing the juice from grapes in order to make wine, the press being of the type which includes:

a) a dripping means, generally formed as a cylindrical grate type, defining a pressing chamber provided with a loading opening and an unloading opening;

b) a thrust means, usually of the cylindrical piston type, which occupies the whole cross-section of the pressing chamber;

c) a retaining means, namely a gate located level with the unloading opening and adjustable in its position with respect to said opening in such a way that it controls the juice extraction pressure.

Known presses of the type the present invention relates to are of two types:

a first one embodies a thrust means constituted by an helicoidal screw which has the drawback of producing significant amounts of mud and which use is barred by the French services of "appellations d'origine";

a second one embodies a thrust means constituted by a piston which has the drawback that it produces strata or layers of the compressed material which must then be reduced using strong operation pressures which achieve a smashing of the vegetal parts of the grapes and produces a downgraded wine (specially in taste). In addition, the quantitative performances of these two types of press are not too high..

BRIEF SUMMARY OF THE INVENTION

This invention was conceived with the following objects, namely:

a) to overcome the above drawbacks through the use of a thrust means suitable to the pressing of different products, and in addition, the possibility to produce said thrust means in a kit for mounting it, in place of helicoidal screws as found in quantities of discarded presses;

b) to make pressing of viscous products easy (including sweet aperitif wines), by including a pre-pressing unit (best outflow of the juice);

c) to increase pressing rates by means of main and auxiliary pressing chambers which can operate simultaneously;

d) to diminish the space occupied by the main pressing chamber;

e) to provide a more thorough pressing due to the location, in the chamber axis area, of a means having a variable geometry and volume which allows radial compression of the already axially compressed products.

The invention accordingly provides a press:

a) including a first thrust means comprising at least two parts each provided with its own driving means, namely of the hydraulic or pneumatic jack type, suitable to be moved, with respect to the dripping means, either simultaneously or separately, in the same sense or in opposite senses, and which in the operational stage of the press, are developed in such a way, that the thrust means has the effect to break the strata and to make them tilt in such a way they are reabsorbed during a new compression;

b) with a main pressing chamber which includes, connected to the loading opening, at least one auxiliary pre-pressing chamber fed with the products to be pressed by means of a loading hopper, and having a smaller volume than that of the main pressing chamber, the auxiliary chamber being associated with a second thrust means, usually of the cylindrical piston type, which crosses the hopper bottom to feed the main pressing chamber, the auxiliary chamber further including its own cylindrical grate type dripping means, and a third thrust means located at the outlet of the pre-pressing chamber and which serves, on one hand as a supporting surface when the second thrust means compresses the product inside the prepressing chamber and on the other hand as transfer means toward the main chamber for the pre-pressed product to allow it to sustain the pressing cycle linked to the first thrust means;

c) wherein the main chamber includes, along its axis, a means having a variable volume and preferably of a cylindrical shape which includes a first rigid area followed by a distortable second area whose volume is increased by the action of a drive in such a way as to radially compress the product previously axially compressed by the main thrust means.

The above and other objects, advantages and features of the present invention will become more apparent from the following description.

BRIEF DESCRIPTION OF THE DRAWINGS

The invention will now be described in detail with reference to the accompanying drawings; wherein.

DETAILED DESCRIPTION

Figure 1A:
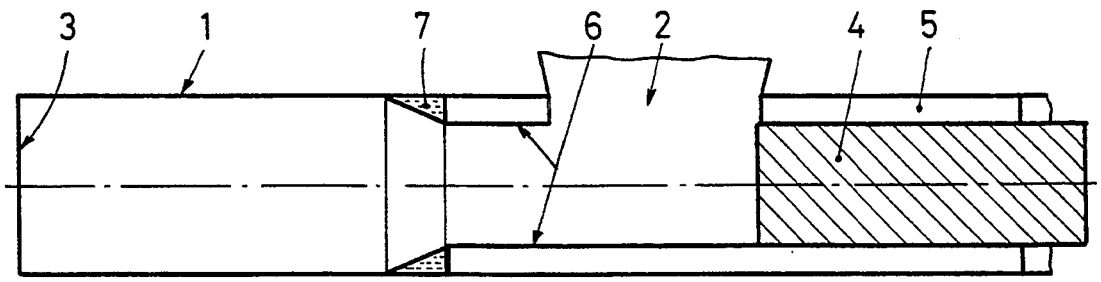
FIGS. 1A to 1E are diagrams of a press according to the invention showing the different stages of operation of a first thrust means.

The unit shown in FIGS. 1A to 1E includes:

a dripping means is in the form of a cylindrical grate of a known type integral with the unit frame, and provided with a loading opening 2 on one side, and an unloading opening 3, at one end of the grate;

a first thrust means constituted by a cylindrical piston, formed in at least two parts, 4 and 5, each provided with its own driving means, usually of the hydraulic or pneumatic jack type, suitable to be moved with respect to the dripping means 1, simultaneously or separately, and in the same sense or in opposite senses, during the operational stages of the press:

The total section of the two parts 4, 5 of the thrust means occupies the whole internal cross-section of the dripping means 1 and the thrust means can advantageously be formed as two concentric parts: one central part 4 provided with a closed or solid surface and a peripheral cylindrical part 5 provided with a side loading opening 2, a secondary peripheral grate 6 and a front surface 7.

The first thrust means can alternatively comprise two parts each corresponding to a half-cylinder: or any other combination and any other shape (square, rectangular, etc.) can be used.

The driving means for the parts which constitute the first thrust means can be integral with the press frame but the driving means of the central part of the thrust means can alternatively be integral with the peripheral part of said means in such a way as to decrease the stroke of said central part and of its driving means; and any other combination can be used.

Figure 1B:
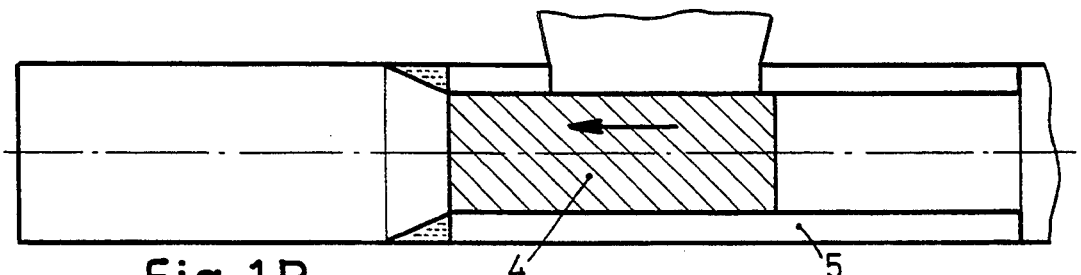
Figure 1C:
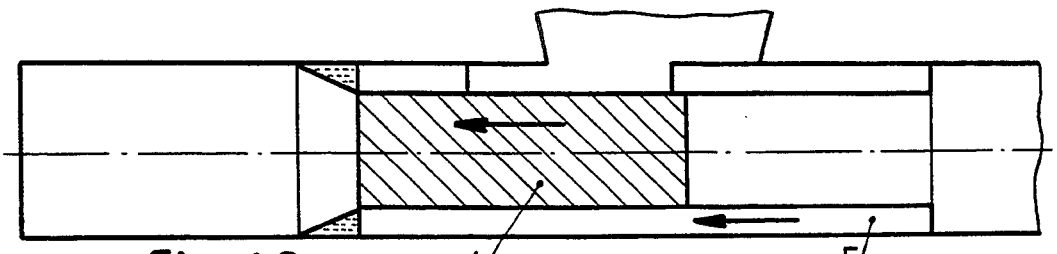
Figure 1D:
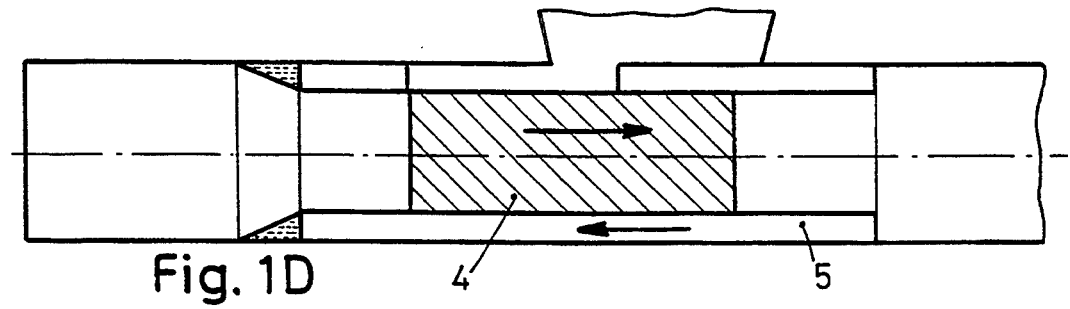
Figure 1E:
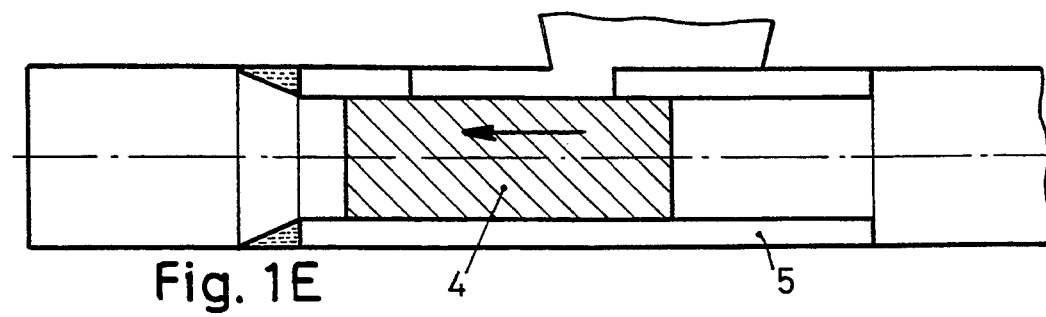

A possible operation cycle of the wine press according to the invention is as follows:

FIG. 1A: loadings;

FIG. 1B: partial compression of the product by the single forward movement of the central piston 4;

FIG. 1C: total compression of the product by the simultaneous forward movement of both parts 4, 5 of the piston;

FIG. 1D: breaking of the compressed product, strata by the forward movement of the peripheral piston 5, with simultaneous cleaning of the grate and tilt of this later by the withdrawal of the central piston 4;

FIG. 1E: additional compression by the forward movement of the central piston 4.

Figure 2:
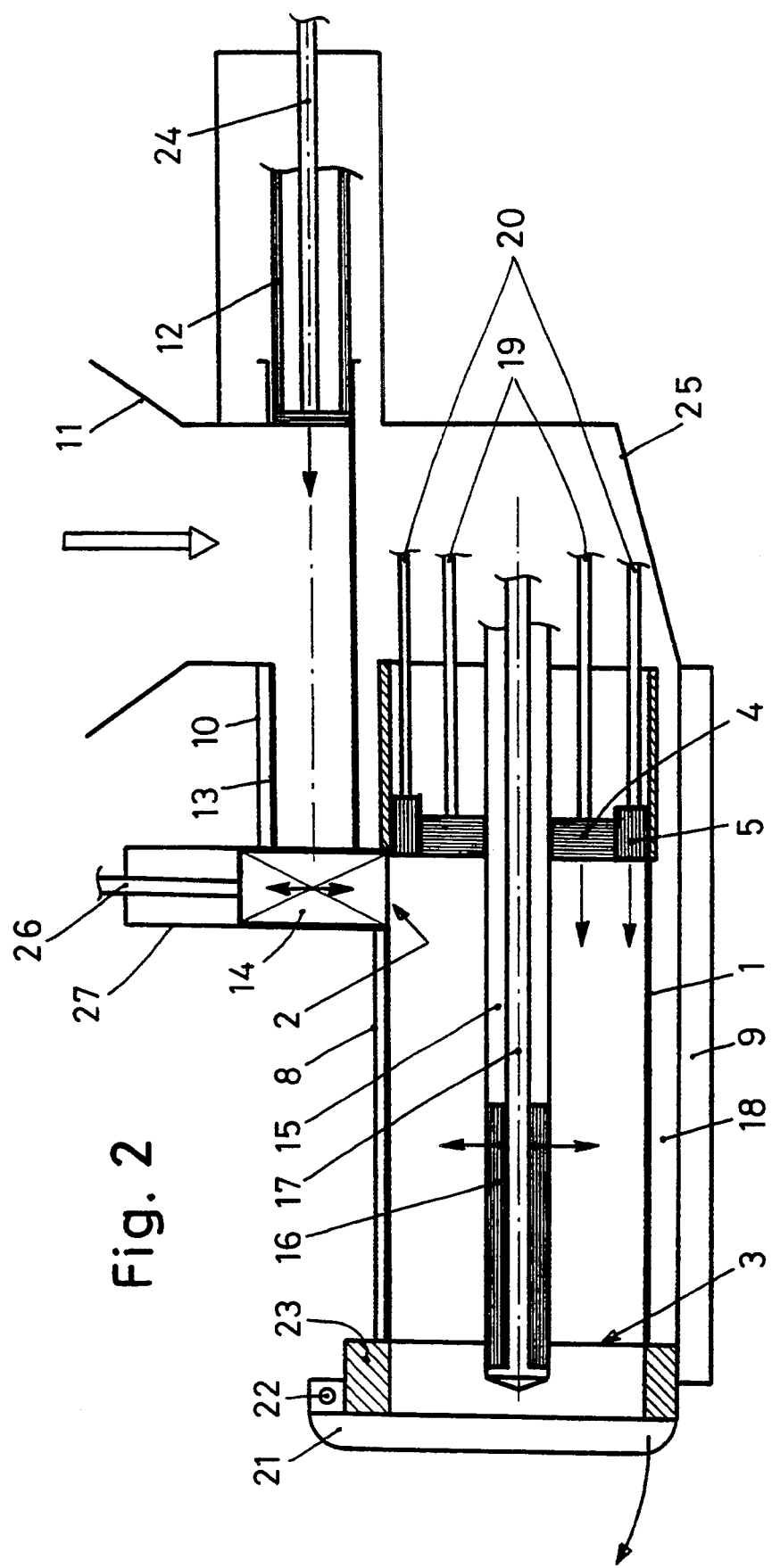
FIG. 2 is a longitudinal-sectional view of an embodiment of a winepress according to the invention.

The stages illustrated in FIGS. 1A to 1E can be consecutive or make a different order, or certain of the stages can be repeated;

The press shown in FIG. 2 includes a main pressing chamber 8 resting on a frame 9 and which includes the dripping means 1, usually of the cylindrical grate type, provided with a loading opening 2, on the top or side, and an unloading opening 3, at one end of the grate. The juices from the pressing operation are collected at the bottom 18 of the chamber 8.

The first thrust means in chamber 8, which is usually cylindrical, comprises two parts 4 and 5 each being provided with a specific driving means, usually of the hydraulic or pneumatic jack type, connected to rods 19 and 20 suitable to be moved, with respect to the dripping means 1, simultaneously or separately in the same sense or in opposite senses. The first thrust means can be formed in two concentric parts: a cylindrical central part 4 and an annular peripheral part 5. The jacks connected to the rods 19 and 20 are shown on FIG. 3.

A grate 21, adjustable in its position by means of a jack (not shown) and which and can turn about the axis 22, is located at the unloading opening and serves as a retaining means during the pressing operation and as draining means in the following step. It is locked at the end 23 of the main chamber 8.

The chamber 8 includes, along its axis, a distortable means of variable volume formed in the shape of a cylinder including a first rigid portion 15 followed by a second distortable portion 16 whose volume can be increased under the action of a mechanical, hydraulic or pneumatic drive 17, in such a way that it radially compresses products which have been previously lengthwise compressed by the thrust means 4,5.

When the drive is mechanical, the parts 15 and 17 move from each other, usually by means of jacks, to compress the area 16, which is of flexible material, so as to increase its volume.

When the drive is pneumatic or hydraulic, a channel 17 is formed in part 15 through which flows a fluid that expands the part 16.

The winepress according to the invention includes in addition, connected to the loading opening 2, an auxiliary pre-pressing chamber 10, having a lower volume than that of the main pressing chamber 8, and fed with product to be pressed by means of a loading hopper 11. A second thrust means 12, usually of the cylindrical piston type, crosses the bottom of the hopper in the pre-pressing chamber which includes its own demusting sieve 13, usually of the cylindrical grate type. A third thrust means, 14 is located at the outlet of the pre-pressing chamber and serves, one side, as a supporting surface when the second thrust means 12 compresses the product to be pressed, and on the other hand as transfer means, toward the main chamber, for the pre-pressed product. The thrust means 12 is in the form of a piston actuated by the rod 24, usually connected to a moving means of the jack type. A casing 25 connects the main chamber 8 to the auxiliary chamber 10. The juice from the chamber 10 is likewise recovered in casing 18. The thrust means 14 is moved by a jack 37, FIG. 3, connected to a rod 26. The thrust means 14 is contained in a transfer chamber 27. The units 10 and 11 can be located vertically with respect to the chamber 8 to decrease the longitudinal space occupied by the winepress. According to a variant of the invention, the part 15 can be replaced by a tube provided with a plurality of holes operating as a drain.

Figure 3:
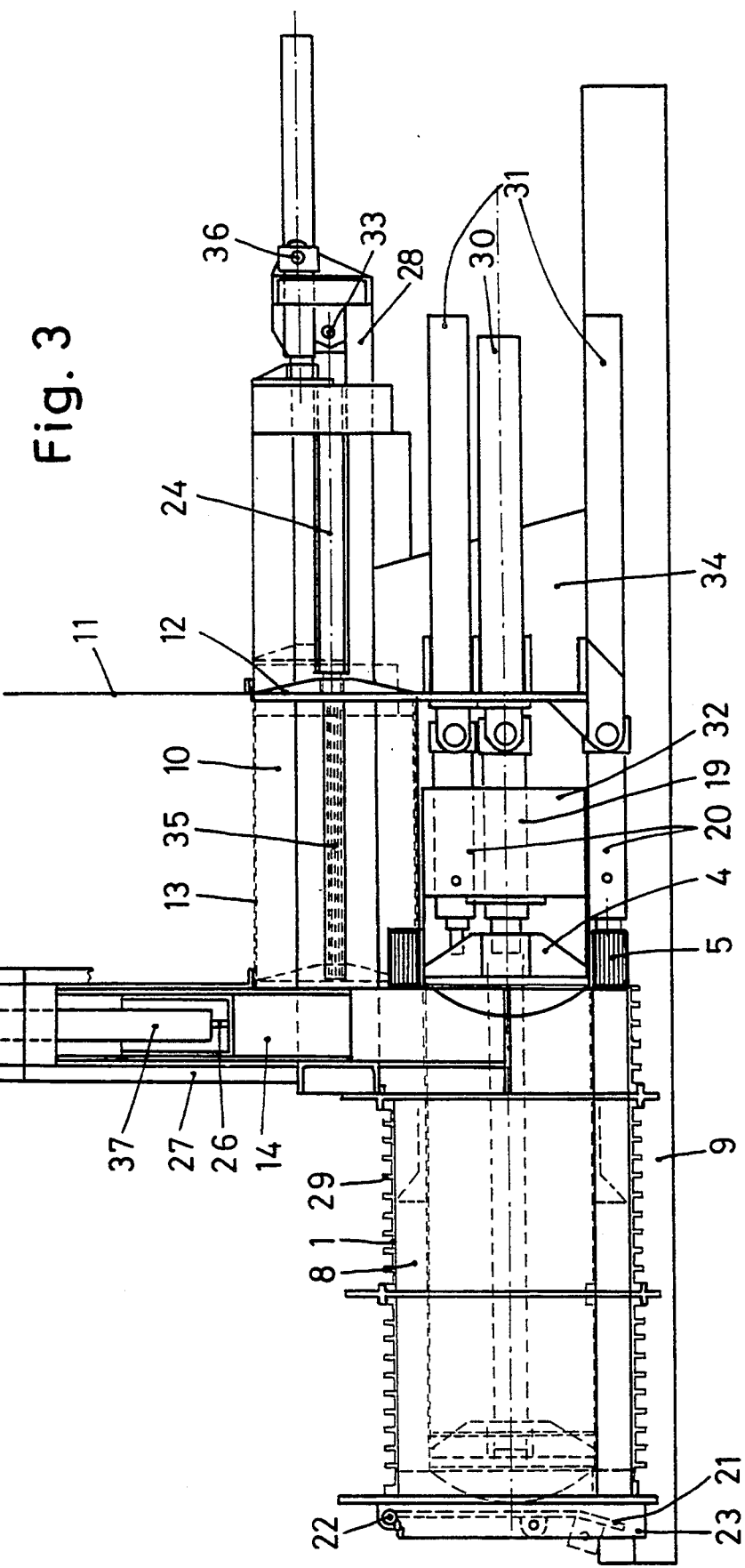
FIG. 3 is a longitudinal-sectional view of a preferred embodiment winepress of the invention.
Figure 4:
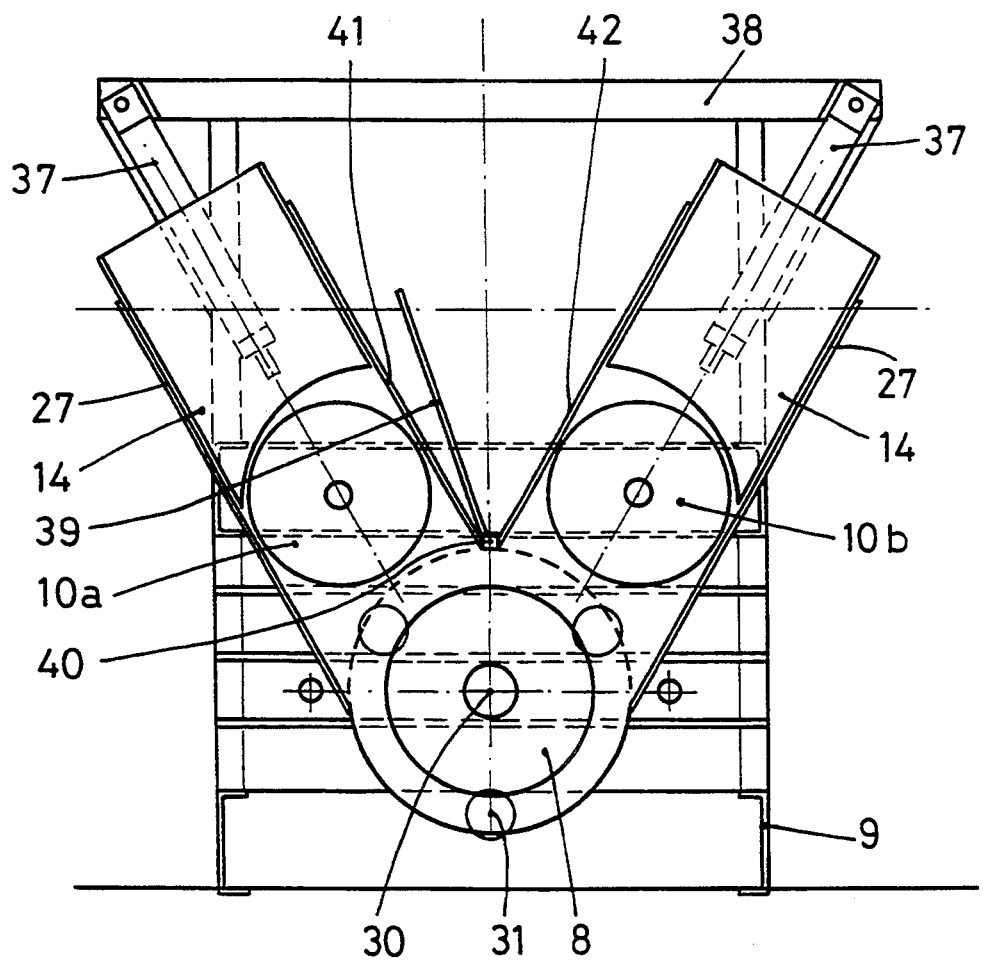
FIG. 4 is a cross-sectional view of part of the press of FIG. 3.

The horizontal winepress shown in FIGS. 3 and 4 includes a main pressing chamber 8 in which the means 15, 16, 17 of the previous embodiment have been eliminated and piston 4 is a solid cylindrical piston. The peripheral annular piston 5 remains without any change. The parts in dots in the drawing show the displacement of the two pistons in the chamber 8. The dripping means 1 has surface reinforcements 29. The rods 19 and 20 driving the pistons 4 and 5 are controlled by jacks 30 and 31, the part 32 acting as a supporting guide. The jacks 31 are preferably three number.

The winepress also includes (see FIG. 4) two auxiliary pre-pressing chambers 10, symmetrical with respect to a lengthwise vertical plane of symmetry of the unit. The rod 24 driving the piston 12 is controlled by the jack 33 integral with an upper frame 28 which is connected to the Lower frame 9 by means of the part 34.

According to a variant of the invention, a pipe 35, of the drain type provided with a plurality of holes is located parallel with the axis of the rod 24 and includes its own lengthwise moving means.

According to another embodiment of the invention, the dripping means 13 is made moveable along its axis by a jack 36 and cooperative slides (not shown). It can be constituted in two parts, an upper moving part and a lower fixed part.

The two pre-pressing chambers 10 can operate simultaneously or alternatively. The piston 12 of each chamber can also be constituted in at least two parts like the pistons 4 and 5 of the main chamber.

A wing or baffle 39 rotating about the axis 40, alternatively closes the loading area 41, 42 of the corresponding auxiliary chamber 10a, 10b (see FIG. 4) which is not being compressed. It is likewise possible, instead of having auxiliary chambers 10a, 10b, which open in parallel into several openings in the main chamber 8, to have in series, auxiliary chambers 10, opening into a single opening of the main chamber 8.

Each transfer chamber 27 includes a piston 14 controlled by a jack 37 integral with a support 38.

The auxiliary chambers 10 can likewise be perpendicular to the main chamber 8 in order to eliminate the transfer chamber 27.

According to another variant of the invention, the pistons, 4 and 5 can be replaced by a single piston group.

According to another variant of the invention, the central piston 4, of a small diameter, can operate as a drain associated with a grate-shaped buffer which is integral with it. It moves forward, in this case, in the pressing chamber before the displacement of the peripheral piston 5.

Figure 5:
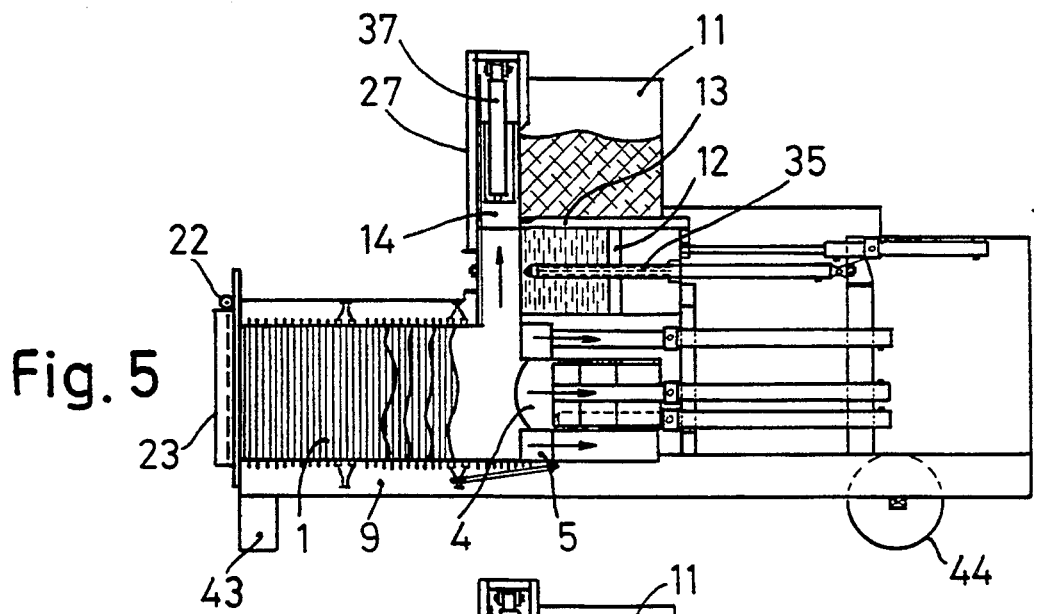
FIGS. 5 to 10 show the general operation of the winepress according to the invention.
Figure 6:
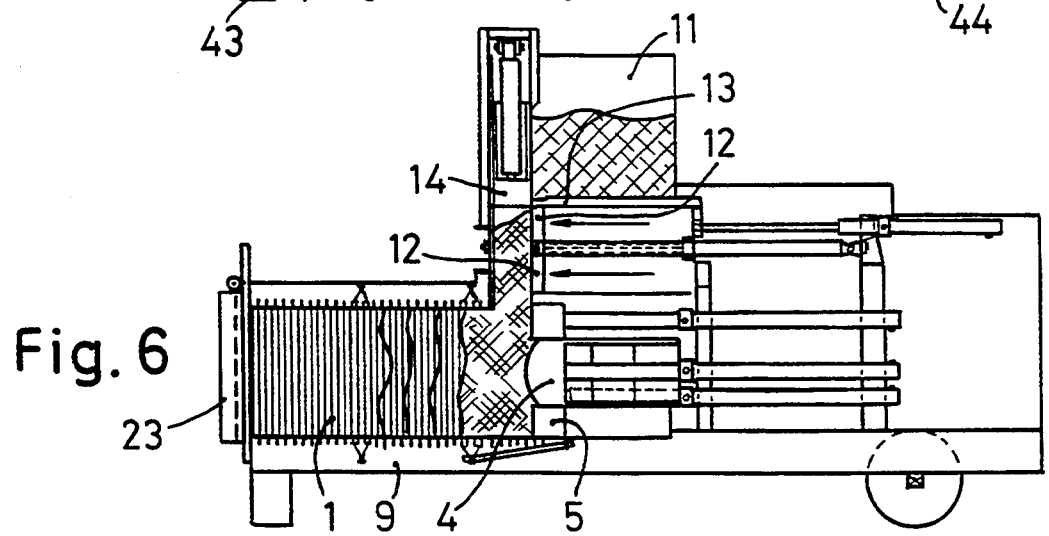

FIGS. 5 to 10 show a general operation cycle of a winepress unit (its frame resting on supports 43 and wheels 44) according to the invention:

FIG. 5 shows the press in preparation to transfer material from auxiliary chamber 10 to the main chamber. At this stage:
  a) pistons 4 and 5 are in backward movement,
  b) piston 14 is in backward movement, and pressure is maintained on the piston 12 in the second auxiliary chamber 10 being maintained;

FIG. 6 shows the press in a transfer stage of material from chamber 10 to the: main chamber and with a first breaking up of strata. In this stage:
  a) piston 12 is in forward movement, and
  b) piston 14 is in forward movement.

Figure 7:
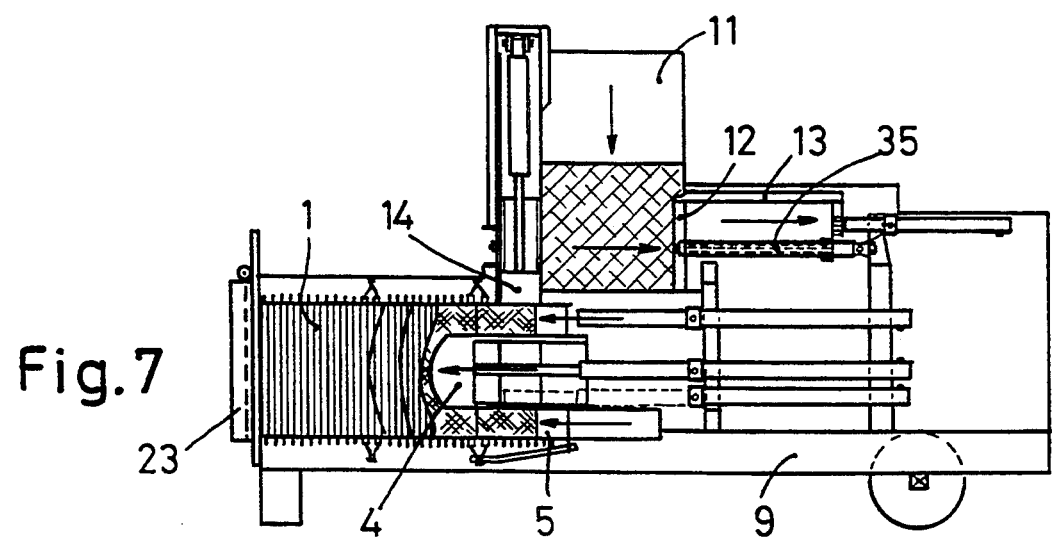

FIG. 7 shows a loading step of material from hopper 11. In this step there is:
  a) backward movement of the ½ moving grate 13,
  b) backward movement of the piston 12 and of the drain 35,
  c) tilt of the loading baffle 39, and
  d) forward movement of the piston 4.

Figure 8:
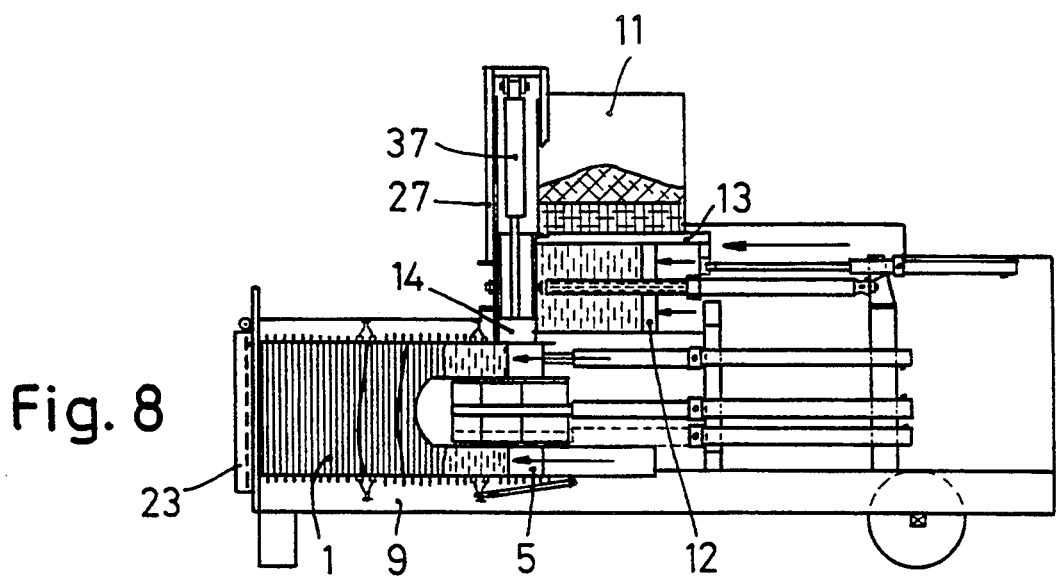

FIG. 8 shows a first pressing stage which includes:
  a) forward movement of the ½ grate 13,
  b) putting the piston 12 under pressure, and
  c) putting the piston 5 under pressure.

Figure 9:
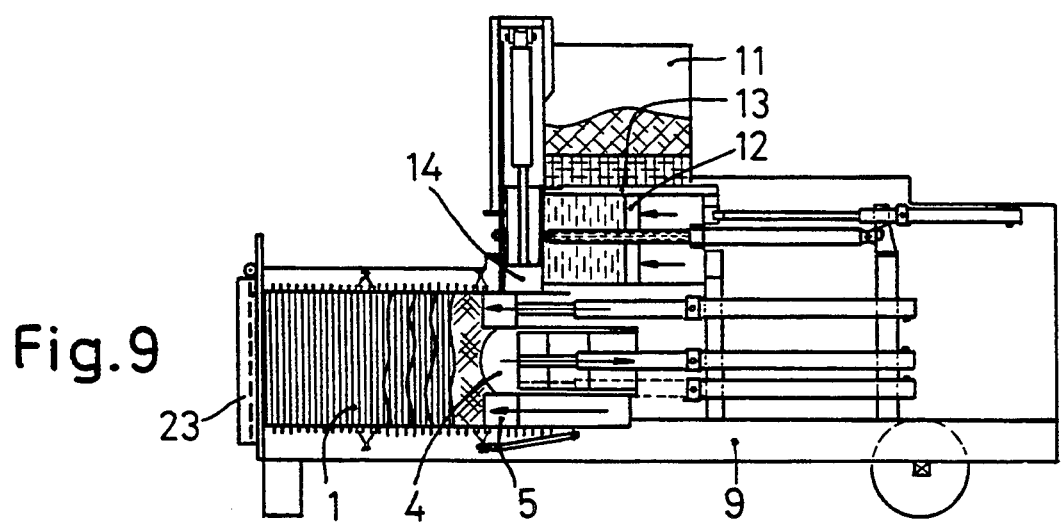
Figure 10:
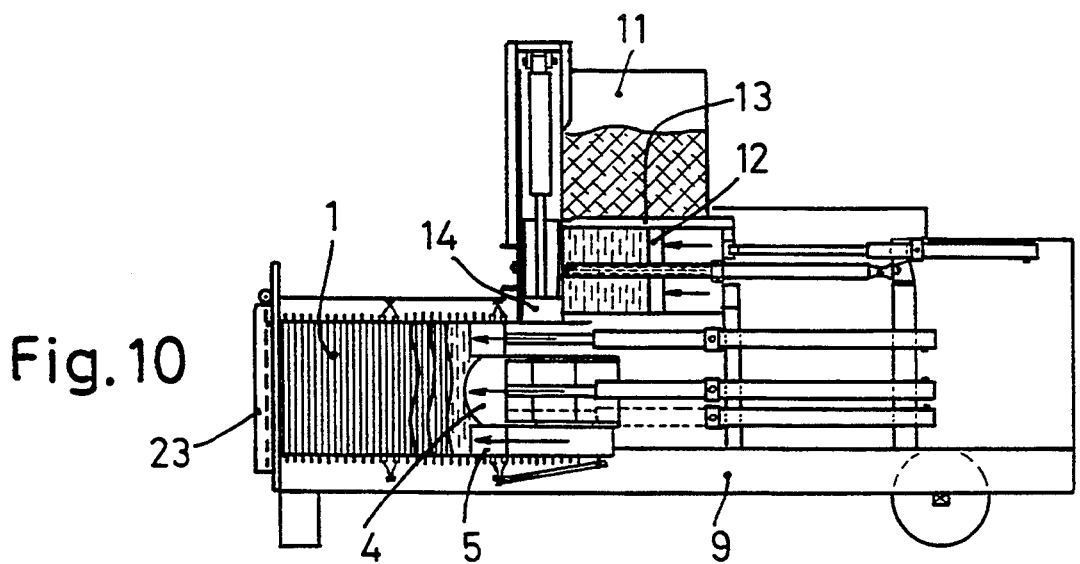

FIG. 9 shows a second breaking up of strata with:
  a) forward movement of the piston 5, and
  b) free backward movement of the piston 4, (the pressure on the pistons 12 of the two auxiliary chambers is maintained.);

FIG. 10 shows a second pressing stage wherein putting the pistons 4 and 5 are pressed forward together up to the scheduled limit and the pressure on piston 12 is maintained. The press then returns to the FIG. 5 position.

All combinations of different stages are possible simultaneously or in alternating manner.

The invention is not confined to the embodiments described and shown for which it can be foreseen other variants in the pistons, the number of auxiliary chambers, and the operation stages, within the scope of the invention.

I claim:

1. A dejuicing press comprising:
  a first dripping means of a cylindrical grate type defining a main pressing chamber of a finite length and cross-section, a loading opening and an unloading opening in the main pressing chamber, a retaining means associated with said unloading opening and adjustable in position with respect to the unloading opening for retaining material within the main pressing chamber, a first thrust means movable lengthwise along a central axis of said main pressing chamber and occupying the entire cross-section of said main pressing chamber for pressing the material within the main pressing chamber, the first thrust means comprising at least two concentric pistons including an inner piston received in an outer annular piston, the pistons being in contact ant relatively movable longitudinally within the main pressing chamber, and independent driving means for each of said pistons for moving the pistons in the main pressing chamber,
  a feed hopper with a lower end defining said loading opening, and
  at least one auxiliary pre-pressing chamber associated with the feed bopper and having a lower volume than the main pressing chamber for delivering material to the main pressing chamber through an outlet of the pre-pressing chamber, said prepressing chamber being defined by a second dripping means of a cylindrical grate type which extends across the lower end of the feed hopper, and a second thrust means mounted for lengthwise displacement within the pre-pressing chamber for pre-pressing material received from the hopper.

2. A dejuicing press as claimed in claim 1, further comprising a transfer chamber located at the outlet of the prepressing chamber, a third reciprocal thrust means in the transfer chamber, the third thrust means providing a supporting surface for closing the pre-pressing chamber in a first press stage of said pressing cycle wherein material is subject to a first pressing by the second thrust means, said third thrust means forming in a second stage of said cycle, a transfer means for feeding the material to the main pressing chamber to be subjected to a second pressing by said first thrust means.

3. A dejuicing press as claimed in claim 1, further comprising a distortable means of variable volume located along a portion of said central axis.

4. A dejuicing press as claimed in claim 3, wherein said distortable means has a cylindrical shape and is secured to a first rigid portion connected to a drive means for altering the volume of said distortable means.

5. A dejuicing press as claimed in claim 1, further including moving means for moving said second dripping means and providing a free passage of material from said feed hopper.

6. A dejuicing press as claimed in claim 1, wherein said second dripping means comprises two independent upper and lower parts.

7. A dejuicing press as claimed in claim 6, further comprising movement means to move only an upper one of the parts of said second dripping means.

* * * * *